May 24, 1927.
J. NELSON
1,629,959
AUTOMOBILE LICENSE PLATE AND THEFT INDICATOR
Filed June 18, 1923      4 Sheets-Sheet 1
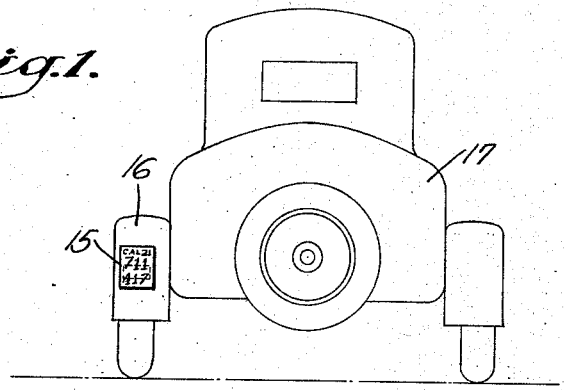
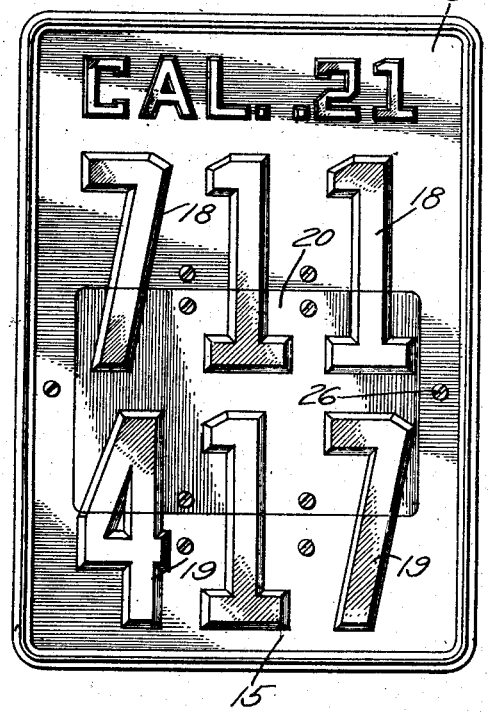
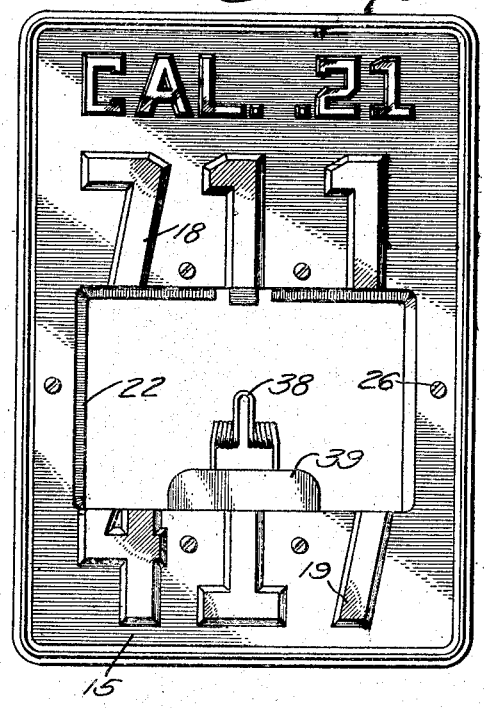
INVENTOR
JONS NELSON
BY
Graham + Harris
ATTORNEYS May 24, 1927.

J. NELSON 1,629,959

AUTOMOBILE LICENSE PLATE AND THEFT INDICATOR

Filed June 18, 1923    4 Sheets-Sheet 2

INVENTOR
JONS NELSON
BY
Graham + Lewis
ATTORNEYS

May 24, 1927. 1,629,959
J. NELSON
AUTOMOBILE LICENSE PLATE AND THEFT INDICATOR
Filed June 18, 1923   4 Sheets-Sheet 3
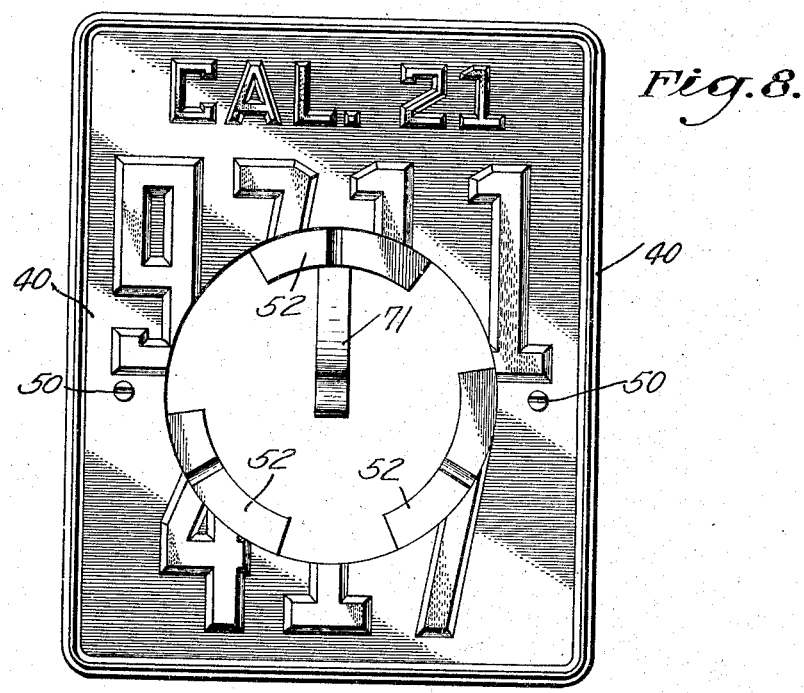
Fig. 8.
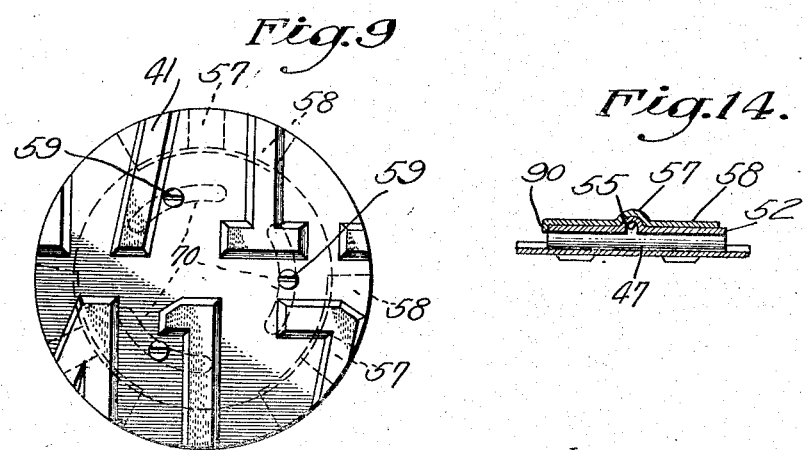
Fig. 9
Fig. 14.
INVENTOR
JONS NELSON
BY
Graham + Lewis
ATTORNEYS INVENTOR
JONS NELSON
BY
Graham + Harris
ATTORNEYS Patented May 24, 1927.

1,629,959

UNITED STATES PATENT OFFICE.

JONS NELSON, OF LOS ANGELES, CALIFORNIA.

AUTOMOBILE LICENSE PLATE AND THEFT INDICATOR.

Application filed June 18, 1923. Serial No. 646,126.

This invention relates to devices for indicating the unauthorized use or theft of automobiles.

It is an object of the invention to provide a license number plate having a removable portion which is of convenient size to be removed from the license plate and carried in the pocket of the driver when he leaves the automobile.

It is a further object of the invention to provide a form of license plate which is particularly suited to the practice of the invention.

It is a further object of the invention to provide the license plate with figures disposed in two superimposed horizontal rows and to make a central area of the plate removable so that when this removable portion is taken from its customary position, the lower portions of the figures in the upper row and the upper portions of the figures in the lower row will be removed therewith, thus leaving the plate with an opening in the center thereof which may be readily discerned and with portions of the figures constituting the number removed. By removing portions of the numbers, it is made impossible for the removable portion of another license plate to be substituted for the proper removable portion belonging to the license plate upon the machine, owing to the fact that the numbers will not match up and therefore the substitution will be immediately recognized.

It is a further object of the invention to provide a license plate having narrow slots formed therein during the stamping of the plate, these slots defining the removable area of the plate and having narrow webs between the ends thereof, which webs may be severed if it is desired to make this central portion removable.

It is a further object of the invention to provide an improved form of attachment which may be employed to hold the removable portions of the license plate.

It is a further object of the invention to provide an electrical means for notifying the driver of the car that he has failed to replace the removable portion in the license plate when he attempts to drive away without first making the replacement.

The specific advantages of the invention and further objects thereof will be made evident hereinafter.

Referring to the drawings which are for illustrative purposes only:

Fig. 1 is a rear elevation of an automobile having a license plate embodying the features of my invention in use thereon.

Fig. 2 is an enlarged face view of a complete license plate.

Fig. 3 is a view showing the central removable portion of the license plate removed so that a central opening is left in the plate.

Fig. 8 is an enlarged face view of the preferred form of license plate, showing the central circular portion removed therefrom and disclosing through this opening the attachment means employed for retaining the removable plate portion.

Fig. 9 is a face view of the central portion which has been removed from the license plate shown in Fig. 8.

Fig. 14 is a fragmentary section taken on a plane represented by the line 14—14 of Fig. 10.

Figure 4:
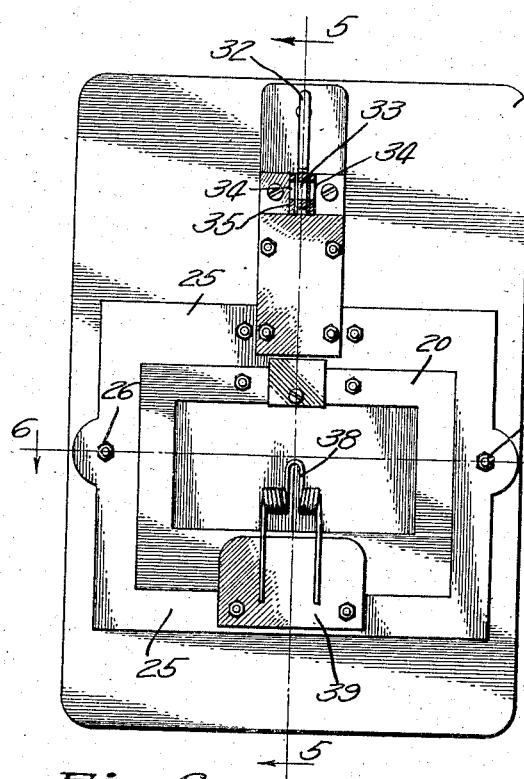
Fig. 4 is a rear view corresponding to Fig. 2.

The invention may be conveniently practised by employing a rectangular number plate 15 of the type shown in Figs. 2 and 3 which may be conveniently mounted upon a rear fender 16 of an automobile 17 as shown in Fig. 1, or upon other portions of the automobile. The plate 15 is provided with a license number consisting of an upper row of figures 18 and a lower row of figures 19. A central rectangular portion 20 of the plate is detachably secured and may be removed from the plate 15, leaving therein an opening 22.

It will be noticed that the removable portion 20 is of such size that it includes the lower portions of the upper row of figures 18, and upper portions of the lower row of figures 19; therefore, when the portion 20 is removed, portions of each figure constituting the license number are removed therewith. It is intended that the removal of the central portion 20 designates that the driver has left the machine and that any further use thereof without the replacement of the central portion 20 is unauthorized and may be considered as theft of the automobile. The license plate and the removable area thereof are of sufficient size to be plainly seen at quite a distance, the absence of the central portion of the plate being quickly recognized from a distance and imparting to the observer the knowledge that the automobile is being wrongfully used.

Figure 5:
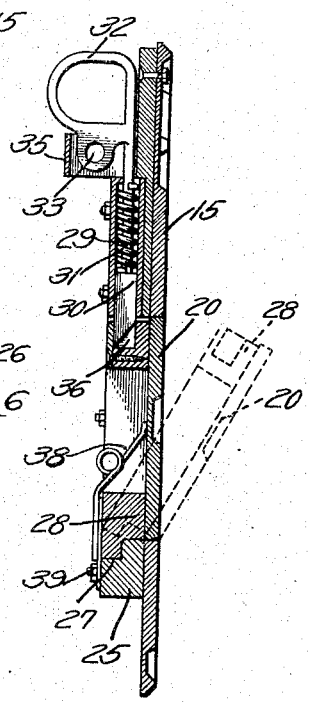
Fig. 5 is a section taken on a plane represented by the line 5—5 of Fig. 4.
Figure 6:
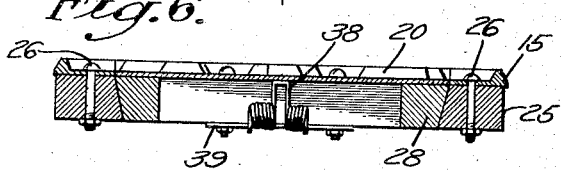
Fig. 6 is a section taken on a plane represented by the line 6—6 of Fig. 4.

As shown in the section, Fig. 5, the license plate 15 has mounted upon the back thereof latch mechanism for holding the removable portion 20 in place, and means for locking the mechanism is also provided to prevent the removal of the central portion 20 by maliciously inclined persons. A frame 25 is secured by bolts 26 upon the rear of the plate 20 and has an opening 27 therewith which receives a cooperating block 28, to which the removable portion 20 is secured. Above the frame 25 is a latch member 29 having a latch dog 30 which is held in normally downwardly disposed position by a spring 31 and a ring or handle 32 by which the latch dog may be drawn upwardly. The handle portion 32 is provided with an opening 33 which cooperates with the openings 34 formed in a strap member 35, these openings 33 and 34 being in alignment when the latch dog is in engagement with the recess 36 formed in the block 28, so that the shackle of a lock may be extended therethrough, thus preventing the lifting of the handle and the release of the latch dog 30. A spring member 38 is mounted upon a plate 39 which is secured to the frame 25 and is so arranged that it forces outwardly against the under side of the removable portion 20, thus facilitating the removal of this portion when the latch mechanism is released, the action of the spring tending to throw the block 28 and its attached removable portion 20 outwardly as indicated by the dotted lines in Fig. 5.

It will be recognized that although there may be numerous license plates of the same size and having the same size removable portions in use, the difference of the arrangement of the figures will prevent the substitution of the removable portion of one license plate for the removable portion of the other.

Figure 7:
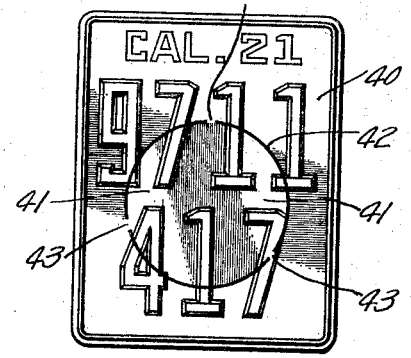
Fig. 7 is a face view to reduced scale of the preferred form of my invention in which form the removable portion of the license plate is made circular and is defined by circular slots or cuts having narrow webs disposed between the ends thereof which may be cut through so that the circular area may be removed from the license plate.
Figure 12:
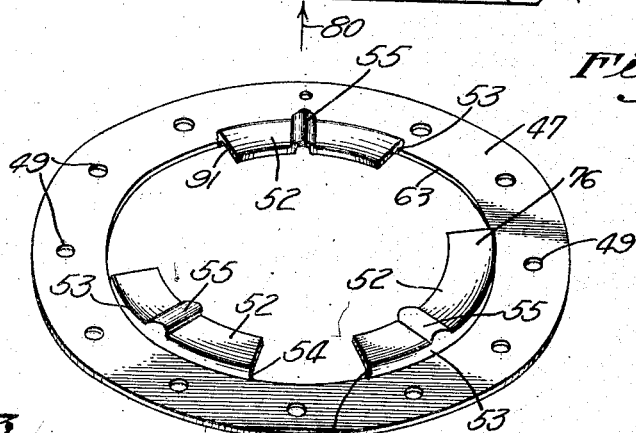
Fig. 12 is a perspective view of the ring member of the mounting device.
Figure 13:
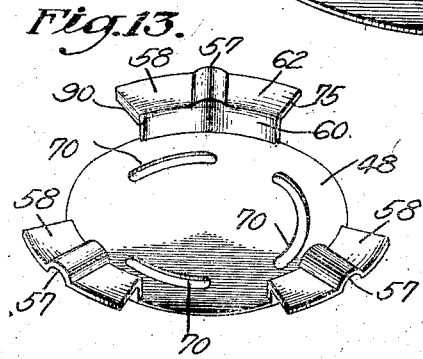
Fig. 13 is a perspective view of the disc portion.

In Fig. 7 I show the preferred form of my invention. In this form of the invention, a plate 40 which may be stamped from sheet metal in the customary manner is employed. A central circular area 41 is defined by narrow slots 42 or cuts perforating the sheet metal. These slots 42 are arcuated in form and are separated at their ends by narrow webs 43 which constitute intercommunicating portions between the plate 40 and the central circular area. The license plate is originally produced in the form shown in Fig. 7 and may be used as an ordinary license plate. If, however, it is desired to employ the plate as a theft prevention device, the web 43 may be severed and the circular central area 41 thus separated from the plate 40. For the purpose of securing the removable portion 41 which is shown to enlarged scale in Fig. 9, to the plate 40 which is further shown in Fig. 8, attachment members consisting of a ring member 47 as shown in Fig. 12 and a disc member 48 as shown in Fig. 13, are employed.

The ring member 47 is provided with a series of evenly spaced holes 49 through which bolts 50 may be extended to secure the ring to the back of the plate 40. The ring 47 has inwardly extending wings 52, which, as shown in Fig. 12, are outwardly offset by narrow walls 53 which extend between the inner edge of the ring 47 and the edges 54 of the inwardly extending wings 52. Outwardly extending cylindrical humps 55 are formed in the wings 52, thus providing locking ridges which cooperate with channels 57 formed in the outwardly extending wings 58 of the disc 48 to which the removable portion of the license plate is secured by bolts 59, Figs. 9 and 10. The wings 58 are offset from the disc 48 by webs 60 which are of greater width than the narrow walls 53 which support the wings 52 of the ring 47 in offset relationship. The circle defined by the outer edges 62 of the wing 58 is slightly smaller than the circle defined by the inner edge 63 of the ring 47, thus making it possible to pass the wings 58 through the spaces between the wings 55 of the ring 47. The wings 58 are of different lengths and the spaces between the wings 55 are varied to correspond therewith in such a manner that the disc 48 may be installed and supported in the ring 47 in only one position, thus making it impossible to insert the plate in other than a position in which the figures upon the removable portion 41 of the plates will register with the figures formed on the plate 40.

The disc 48 is provided with arcuated slots 70 through which the bolts 59 which are employed for securing the removable portion 41 may pass. These slots provide a movement of the bolts so that the position of the portion 41 may be adjusted in register with the figures formed upon the license plate 40.

Figure 10:
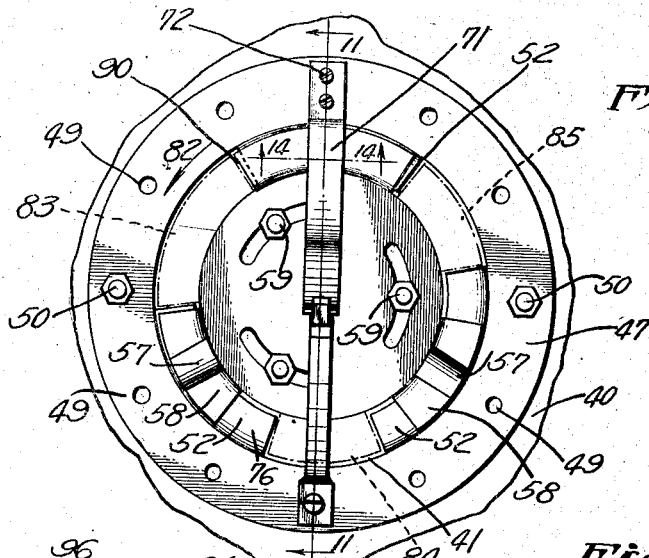
Fig. 10 is a fragmentary rear view showing the attachment members situated upon the back of the license plate shown in Fig. 8 and upon the back of the removable portion shown in Fig. 9.
Figure 11:
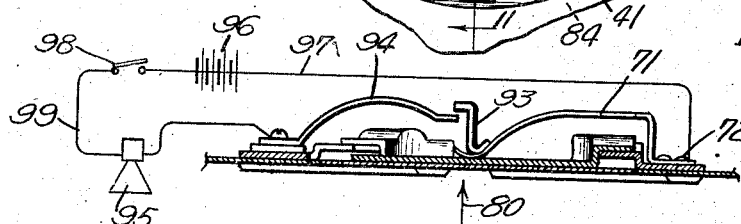
Fig. 11 is a section taken on a plane represented by the line 11—11 of Fig. 10, this figure also showing the electrical connections.

As shown in Figs. 8, 10 and 11, a spring 71 is mounted upon the ring 47 by means of screws 72, the inner end thereof extending inwardly so as to engage and press outwardly against the disc 48. In Fig. 10, which is a fragmentary rear view of that portion of the license plate 40 from which the ring 47 is mounted, the disc 48 having the removable portion 41 mounted thereon, is shown in locked position. In other words, the outer faces 75, Fig. 13, rest against the inner faces 76, Figs. 10 and 12. The channels 57 of the wings 58 fitting over the ridges 55 of the wings 52, the spring forcing forwardly against the back of the disc 48 and holding the channels 57 in engagement with the ridges 55 so that rotation of the disc is prevented. When it is desired to remove the portion 41 from the license plate 40, the plate is forced rearwardly as indicated by the arrow 80 in Fig. 11, so that the spring 71 will be depressed and the disc 48 moved rearwardly into a position in which the channels 57 will clear the ridges 55. The plate may then be rotated in the direction indicated by the arrow 82 in Fig. 10, thus bringing the wings into the positions 83, 84 and 85, in which positions they will pass outwardly between the wings 55. The edge of one of the wings 58 as indicated at 90 in Figs. 10, 13 and 14 is inwardly bent to provide a flange which will come into engagement with the edge 91, Fig. 12, of the wing 52, thus providing a stop for preventing the removable portion 41 from being rotated beyond the position in which the channels 57 and the ridges 55 coincide when the removable portion 41 is being replaced.

A further feature of the invention consists of a means for notifying the driver that he has failed to replace the removable portion of his license plate. This feature consists of a contact member 93 as shown in Fig. 11, which is mounted upon the spring 71. When the removable portion 41 is removed from the license plate, the spring is allowed to swing forwardly in a direction opposite to that indicated by the arrow 80, thus making contact with a member 94 and closing a circuit which feeds the automobile horn 95, this circuit consisting of a battery 96, a conductor 97 making contact with the spring 71, and a conductor 99 which makes contact with the member 94 and has situated therein the horn 95 and the ignition switch 98.

When the driver has failed to replace the portion 41 and entering the car turns on the ignition switch, the horn 95 will be operated and will inform him that he has failed to replace the portion 41. When the portion 41 has been replaced, so that the spring 71 is depressed, the members 93 and 94 are separated and the circuit feeding horn 95 is broken, therefore making it possible to close the ignition switch without operating the horn.

I claim as my invention:

1. A license number display member comprising: a plate member upon which the figures constituting the license number are arranged, a central portion of said plate of sufficient area to include the lower portions of the upper row of figures and the upper portions of the lower row of figures being removable by the driver when leaving the automobile upon which said display member is mounted, to indicate that any subsequent use of the automobile is unauthorized, said removable portions being circular in form; and means operative through relative rotation for removably securing said removable portion.

2. A license plate for automobiles consisting of: a plate having a central portion defined by perforations and connected to the surrounding part of the plate by webs, and having figures on the front face thereof constituting a license number, said numbers being partially on said surrounding part and partially on said central area of said plate, said central portion being detachable from said surrounding part by severing said webs.

3. A license plate for automobiles consisting of: a plate having a central portion situated in the same plane as said plate, being defined by perforations and connected to the surrounding part of the plate by webs, and having figures on the front face thereof constituting a license number, said numbers being partially on said surrounding part and partially on said central area of said plate, said central portion being detachable from said surrounding part by severing said webs.

4. A license plate for automobiles consisting of: a plate having a central portion defined by long narrow arcuated perforations and connected to the surrounding part of the plate by webs, and having figures on the front face thereof constituting a license number, said numbers being partially on said surrounding part and partially on said central area of said plate, said central portion being detachable from said surrounding part by severing said webs.

5. A license number display member comprising: a plate member upon which the figures constituting the license number are arranged, a central portion of said plate of sufficient area to include the lower portions of the upper row of figures and the upper portions of the lower row of figures being removable by the driver when leaving the automobile upon which said display member is mounted, to indicate that any subsequent use of the automobile is unauthorized, and means operative through relative rotation for removably securing said removable portion.

6. A license plate for automobiles consisting of: a plate having a central opening; a central portion adapted to be placed in said central opening, said central portion being removable from said plate at substantially right angles to the plane thereof; a license number, a part of said number being carried by said central portion and a part of said number being carried by said plate; and means for retaining said central portion in said opening, one element of said means being attached to said plate and another element of said means being attached to said central portion.

In testimony whereof, I have hereunto set my hand at Los Angeles, California, this 9th day of June, 1923.

JONS NELSON.